(No Model.)

R. ANDERSON.
CAR COUPLING.

No. 263,090. Patented Aug. 22, 1882.

WITNESSES:
Theo. G. Hoster
C. Sedgwick

INVENTOR:
R. Anderson
BY Munn & Co.
ATTORNEYS.

N. PETERS, Photo-Lithographer, Washington, D. C.

UNITED STATES PATENT OFFICE.

ROBERT ANDERSON, OF WEST NEW ANNAN, NOVA SCOTIA.

CAR-COUPLING.

SPECIFICATION forming part of Letters Patent No. 263,090, dated August 22, 1882.

Application filed June 10, 1882. (No model.)

*To all whom it may concern:*

Be it known that I, ROBERT ANDERSON, of West New Annan, in the county of Colchester and Province of Nova Scotia, have invented a new and Improved Car-Coupling, of which the following is a full, clear, and exact description.

The invention consists in a hook pivoted to a hanger suspended from the draw-head, which hook is provided with a pivoted latch having a beveled lower end, against which a spring-strip rests for locking this latch in the desired position. This latch can be raised by means of a pivoted bail passing through a slot in the body of the hook and through a slot in the latch. A ring is hung loosely in the outer end of the hook, and is adapted to pass into the hook on the opposite draw-head.

Reference is to be had to the accompanying drawings, forming part of this specification, in which similar letters of reference indicate corresponding parts in both the figures.

Figure 1:
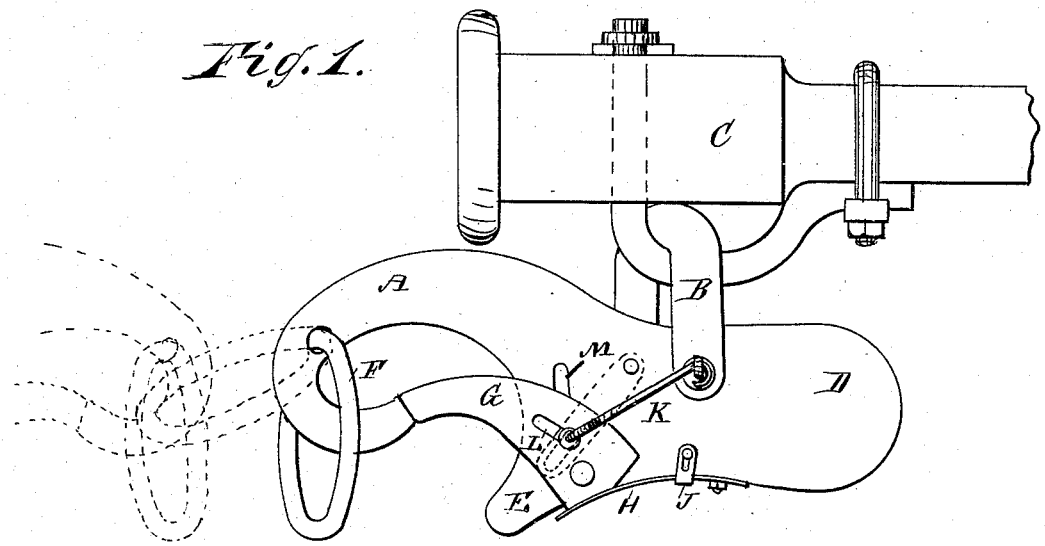
Figure 2:
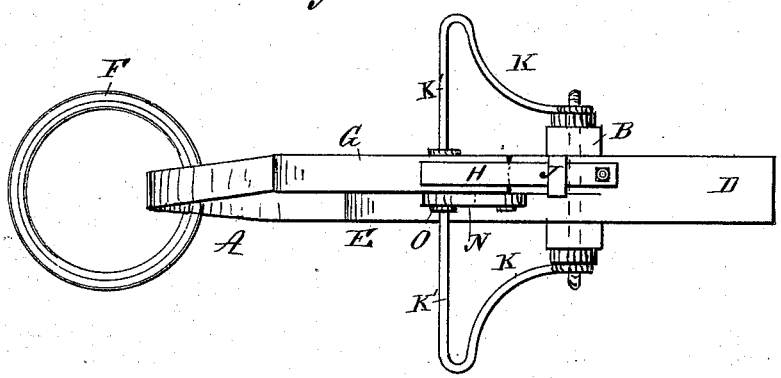

Figure 1 is a longitudinal elevation of my improved car-coupling. Fig. 2 is a plan view of the under side of the same.

A large hook, A, is pivoted to the ends of the shanks of a U-shaped hanger, B, which is held to the under side of the draw-head C in such a manner that the hook projects beyond the end of the draw-head and will be counterbalanced by the enlarged or weighted rear part, D, of the hook. The hook A is provided with an outwardly-projecting thumb, E, at its lower edge, which thumb is to guide the coupling-ring of the other hook upward. A coupling-ring, F, of the proper size, passes loosely through an aperture in the front curved part of the shank of the hook A. A latch-plate, G, is pivoted to the body of the hook A in such a manner that the beveled lower edge of this latch-plate will project slightly beyond the edge of the body of the hook A. A flat spring, H, attached to the lower edge of the body of the hook A, rests against the lower beveled edge of the latch-plate G. A clip, J, having its ends bent upward and provided with longitudinal slots, is passed under the spring and secured to the hook by means of screws or studs passed through the slots into the side of the body of the hook A, so that this clip or strip J can be adjusted higher or lower, according to the desired tension of the spring H. A bail, K, is pivoted or otherwise attached to the ends of the pintle, pivoting the hook A to the hanger B, and the transverse piece K' of this bail passes through a longitudinal slot, L, in the latch-plate G and through a vertical slot, M, in the body of the hook above the thumb E. The transverse piece K' must project some distance from the sides of the hook, so that it can easily be reached by a brakeman at the side of the car. The hanger B is preferably held to the draw-head by a curved or other rod passed through the pin-opening of the draw-head, but can be attached in any other suitable manner. A piece of metal, N, or lock-plate, is pivoted to the side of the body of the hook A, and is provided at its lower end with a longitudinal slot, through which the transverse piece K' of the bail K passes.

The operation is as follows: If the cars are to be coupled, the latch G is raised by raising the outer end of the bail K, whereby the latch G will be turned on its pivot and will slightly depress its spring H, which spring locks the latch in its opened or raised position. The ring F of the other hook A can be passed into the hook A, and then the latch G is turned downward to close the hook A and retain the ring F in the same. The spring H presses against the lower beveled edges of the latch G, always holds the same in position, and prevents accidental opening of the hook A and subsequent uncoupling of the cars. The link-pin N also assists in preventing accidental raising of the latch G, but does not interfere with raising the latch by means of the bail K. Nuts O or collars are secured on the transverse piece K' at the sides of the block N and the latch G to hold the transverse piece K' in place.

Having thus fully described my invention, what I claim as new, and desire to secure by Letters Patent, is—

1. In a car-coupling, the combination, with the hook A, of the ring F and the pivoted latch G, substantially as herein shown and described, and for the purpose set forth.

2. In a car-coupling, the combination, with the hook A, of the ring F, the pivoted latch G, and the pivoted bail K, substantially as herein shown and described, and for the purpose set forth.

3. In a car-coupling, the combination, with the hook A, of the ring F, the pivoted latch G, the pivoted bail K, and the lock-piece N, substantially as herein shown and described, and for the purpose set forth.

4. In a car-coupling, the combination, with the hook A, of the ring F, the pivoted latch G, provided with a beveled lower edge, and of the spring H, resting against this beveled edge of this latch, substantially as herein shown and described, and for the purpose set forth.

5. In a car-coupling, the combination, with the hook A, provided with a slot, M, the pivoted latch G, provided with a slot, L, the pivoted bail K, passing through these slots, and of the ring F, substantially as herein shown and described, and for the purpose set forth.

6. In a car-coupling, the combination, with the draw-head C, of the hanger B, the hook A, pivoted to the same, the ring F, the pivoted latch G, and devices for operating and locking the same, substantially as herein shown and described, and for the purpose set forth.

7. In a car-coupling, the combination, with the hook A, of the latch G, the bail K, and the lock-piece N, substantially as herein shown and described, and for the purpose set forth.

ROBERT ANDERSON.

Witnesses:
ISABELLA EATON,
H. E. SMITH.